United States Patent [19]
Smith

[11] 3,789,706
[45] Feb. 5, 1974

[54] NUT COLLECTING AND RETAINING SOCKET FOR POWER TOOLS

[75] Inventor: William Stephens Smith, Houston, Tex.

[73] Assignee: Dresser Industries, Inc., Dallas, Tex.

[22] Filed: June 26, 1972

[21] Appl. No.: 266,171

[52] U.S. Cl. .................................. 81/57.29, 81/125
[51] Int. Cl. ............................................. B25b 21/00
[58] Field of Search .... 81/57.29, 57.23, 125, 124.1; 10/155 R

[56] References Cited
UNITED STATES PATENTS

| | | | |
|---|---|---|---|
| 2,868,053 | 1/1959 | Jorgensen et al. | 81/57.23 |
| 2,895,360 | 7/1959 | Madsen | 81/57.23 |
| 848,194 | 3/1907 | McMurtry | 81/124.1 |
| 2,461,680 | 2/1949 | Covsino | 81/125 |
| 916,507 | 3/1909 | Van Wie | 81/57.29 |
| 2,636,410 | 4/1953 | Murrill | 81/57.29 |

FOREIGN PATENTS OR APPLICATIONS

| | | | |
|---|---|---|---|
| 1,830 | 1/1913 | Great Britain | 81/124.1 |

*Primary Examiner*—James L. Jones, Jr.
*Attorney, Agent, or Firm*—Daniel Rubin

[57] ABSTRACT

A nut socket attachment for a power driven nut fastener. An elongated housing encloses a central drive operably attachable to the output of a powered nut fastener. A wrench socket is rotatably driven by the central drive and includes a hexagonal socket recess in which to collect and retain a received nut. Spring biased to project axially inward of the socket recess, is a peripherally threaded relatively stationary cylindrical nut collecting and retaining member. Rotating the socket initially in a reverse direction draws or collects the received nut onto the retainer inwardly of the socket. Subsequently, rotating the socket in a forward direction forces the collected nut off the retainer outwardly of the socket onto its fastening bolt or stud.

10 Claims, 7 Drawing Figures

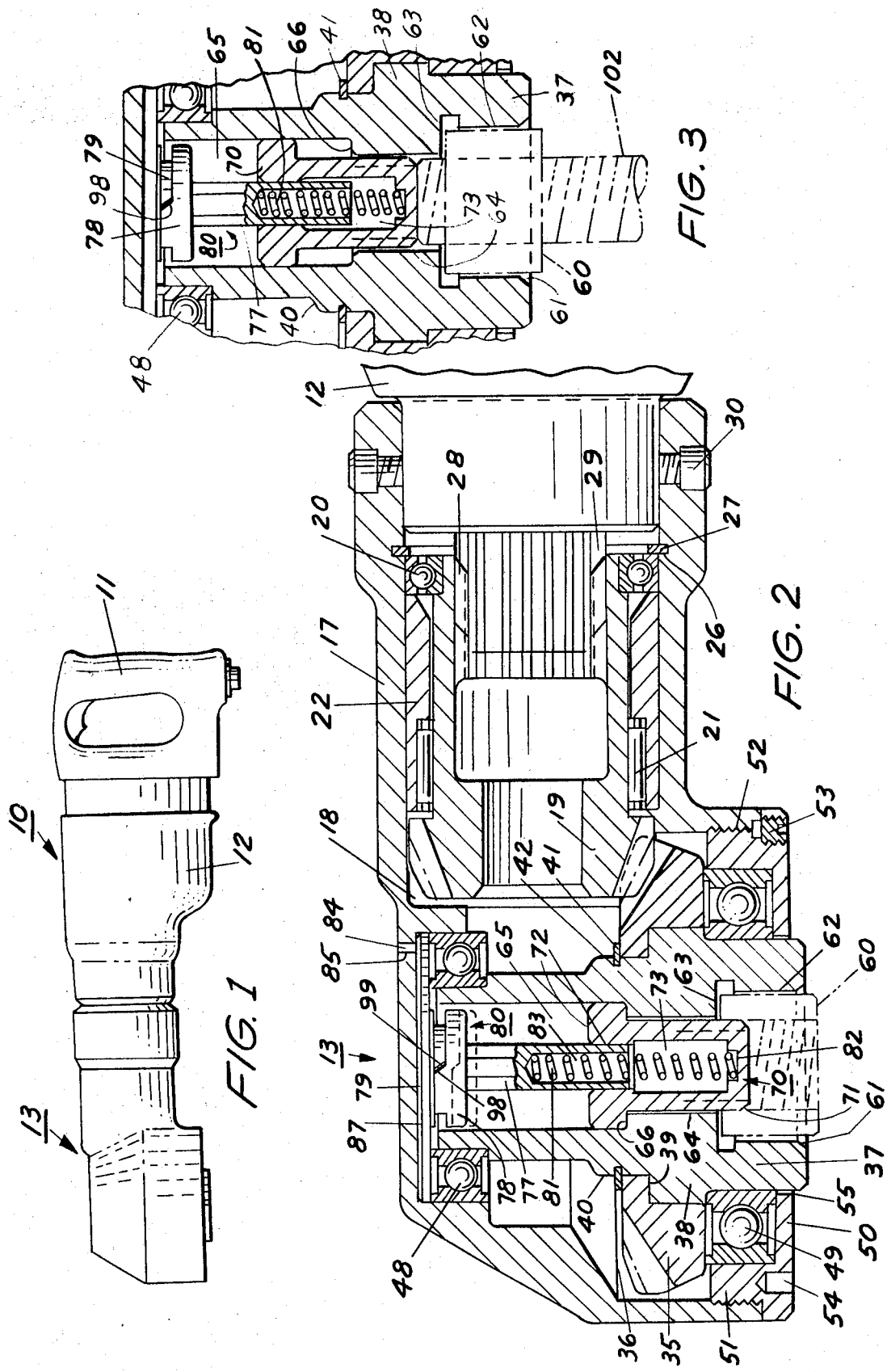

Patented Feb. 5, 1974
3,789,706
2 Sheets-Sheet 2
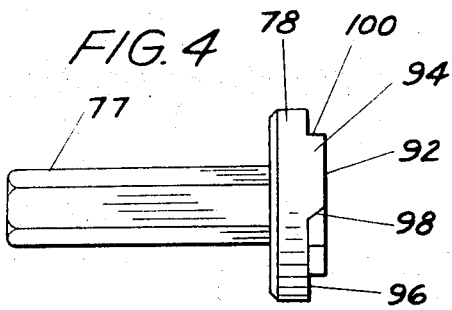
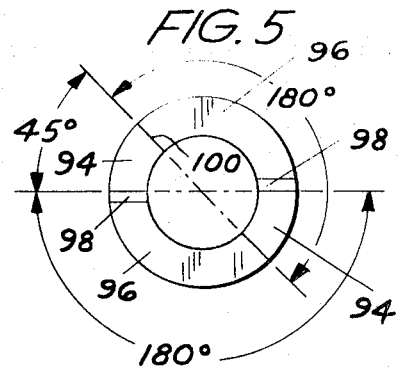
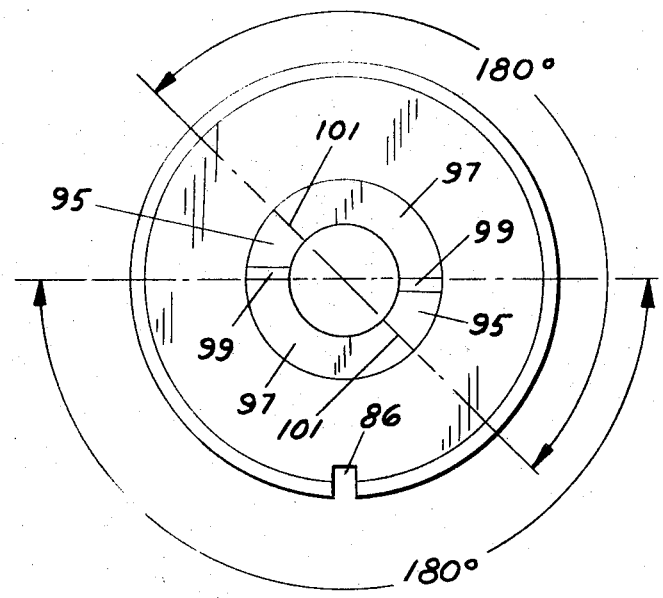
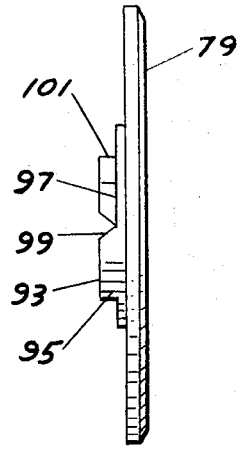

NUT COLLECTING AND RETAINING SOCKET FOR POWER TOOLS

BACKGROUND OF THE INVENTION

1. The field of art to which the invention pertains includes the art of chucks and sockets.

2. Socket type fastener retainers on either manual or power tools for hex nut and/or bolt head fasteners are widely known. They function as a convenience feature in aiding the operator to initiate threaded assembly onto the fastener counterpart. In some instances these retainers are also employed to collect a fastened bolt or nut for removal from the work area. Construction of such retainers usually consists of a form of spring biased detent projecting radially inward of a socket face. On receiving the nut or bolt head, the detent forces it radially against the opposite socket face in a retaining hold from which it can be withdrawn after the intended fastening is completed.

These prior type retainers are considered generally satisfactory for most applications of moderately difficult or hard-to-reach locations. However, in addition to shifting the fastener off the socket center, these prior devices also tend to angularly cock the fastener axially offset of the socket rendering thread starting in remote locations most difficult, if not impossible. This has been found to be particularly true when employed on power tools. At the same time, these features similarly render initial collection of a fastened nut somewhat difficult, if not virtually impossible.

SUMMARY

This invention relates to a nut socket attachment for a power driven nut fastener such as a nut runner, impact wrench or the like. In accordance herewith, previous difficulties associated with prior detent type retainers is eliminated by a construction collecting a received nut in perfectly secured coaxial alignment within the socket. This is achieved by use of a rotatable socket adapted for driven attachment to the output end of a tool with which it is to be used. A peripherally threaded cylindrical nut retainer for collecting the nut is spring biased to project inwardly of the socket. Initial reverse operation of the tool socket against the nut hex causes the nut to thread onto the relatively stationary retainer until bottoming against the hex socket bore. A clutch connected to the retainer is generally effective in securing the retainer against rotation. On the nut bottoming against the socket, the clutch enables reverse direction rotation of the retainer concomitantly with the socket. When reaching the latter relation, the tool is appropriately positioned engaging the fastener counterpart at which time the tool is operated in a forward direction. This causes the nut to thread off the retainer onto the receiving bolt or stud. Unlike similar purpose devices of the prior art, this construction secures the nut at all times in perfectly coaxial alignment within the socket thereby enhancing its assembly and/or positive collection in otherwise remote and difficult assembly areas.

It is therefore an object of the invention to provide a novel nut socket attachment for a power driven nut fastener.

It is a further object of the invention to provide a novel nut socket attachment as in the previous object that collects and secures the nut at all times in perfectly coaxial alignment within the socket.

It is a still further object of the invention to provide a novel nut socket attachment for power tools affording enhanced reliability for effecting nut thread starting and/or positive collection in remote or difficult assembly areas.

BRIEF DESCRIPTION OF THE DRAWINGS

FIG. 1 is a side elevation of an impact wrench utilizing the attachment hereof;

FIG. 2 is an enlarged sectional elevation of the socket attachment in its collected nut retaining relation;

FIG. 3 is a fragmentary sectional elevation corresponding to FIG. 2 for the post-threading fastener assembled relation thereof;

FIG. 4 is a side view of the dog clutch jaw;

FIG. 5 is an end view of the dog clutch jaw;

FIG. 6 is a side view of the stationary clutch jaw; and

FIG. 7 is an end view of the stationary clutch jaw.

Referring now to the drawings and initially to FIG. 1, there is shown a pneumatic impact wrench 10 of a commercially available type. The wrench includes a grip handle 11 for controlling its operating mechanism contained in a motor housing 12. Mounted onto the output drive end of the housing is the attachment in accordance herewith designated 13. It should be appreciated that an impact wrench is being referred to as a matter of convenience for purposes of disclosure. It is only one of a variety of nut fastening power tools, with which the attachment hereof can be utilized and it is therefore not intended as limiting use of the invention. Likewise attachment 13, that will be described in detail below, is an embodiment adapted for right angle hard-to-reach fastening operations. This is likewise not intended as a limitation since the invention can be readily adapted otherwise for axially direct operation as will be understood.

Referring now to the additional figures, attachment 13 is comprised of a generally hollowed housing 17 to accommodate the operating components. For effecting a drive transmitting connection with impact wrench 10, the housing defines a central bore 18 containing a bevel drive pinion 19 rotatably supported by ball bearings 20 and needle bearings 21. A sleeve 22 fits snugly within bore 18 for positioning the respective bearings while an annular retainer ring 26 snapped into annular housing recess 27 secures the foregoing elements against axial pullout. Forming the drive connection is a female spline 28 internally of pinion 19 that coacts with male spline 29 on the output nose of wrench 10. Securing the attachment to wrench housing 12 in this relation are a plurality of angularly displaced lock screws 30.

Operably driven by pinion 19 is a bevel gear 35 in mesh therewith and contained within housing bore 36 axially extending perpendicular to bore 18. Gear 35, in turn, is securably mounted onto nut collecting and driver spindle 37 that includes nut receiving socket 61 outwardly exposed at its lower terminal end. For mounting and interlocking gear 35 onto spindle 37 their mutually engaging surfaces are of a complementary hexagonal cross-section in which spindle 37 includes a hexagonal flange 38 terminating at shoulder 39 that merges with axially extending neck 40. Securing the gear axially against shoulder 39 is an annular retainer ring 41 seated in annular slotted recess 42. Spindle 37, in turn, is rotatably supported within bore 36 by means of ball bearings 48 and 49, the latter being secured in position by a retainer plate 50 having an integral plug portion 51 threaded on its exterior 52 for screwed attachment to the otherwise open housing end thereat. A central bore 55 in the plate provides an opening through which the spindle extends. Set screw 53 secures the assembled relation whereas angularly displaced bores 54 (one shown) enables removal of plate 50 by means of a conventional spanner wrench.

For receiving or collecting a nut shown in phantom and designated 60, spindle 37 includes a hex socket 61 of appropriate size to closely accommodate the nut and generally defined by sidewalls 62 and top wall (as viewed in the drawings) 63. Coaxially communicating with the socket is a centrally elongated bore 64 opening via a radial shoulder 66 into an elongated counterbore 65. Contained within bore 64 and normally seated against shoulder 66 in the manner illustrated in FIG. 2, is a cylindrical, sectionally T-shaped nut retainer member 70. In its normal relation, the lower terminal end of member 70 being threaded at 71, projects or penetrates inwardly of the socket.

Retainer member 70 is hexagonally bored at 72 that opens into enlarged lower counterbore 73. Slideably received for rotational interlock with bore 72 is a hexagonal shank 77 of a dog clutch jaw 78 which with stationary clutch jaw 79 comprise a slip clutch 80. While the former jaw is rotationally interlocked with the retainer, jaw 79 is secured sandwiched between the upper face of bearing 48 and the inside housing face 87 thereat. A dowel 84 extending through lateral housing aperture 85 past face 87 into jaw slot 86 prevents rotation of jaw 79 for reasons as will be understood. A coil spring 81 compressed internally between counterbore end recess 82 of the retainer and jaw shank bore 83 urges retainer 70 and clutch jaw 78 away from each other while at the same time urging the clutch jaws engageably against each other in the manner best seen in FIG. 2.

Clutch 80 functions generally to restrain rotation of retainer 70 against any drag imposed by rotating spindle 37. However, in one instance, i.e., on nut seating against socket wall 63 during initial collection of the nut, the clutch enables rotation of retainer 70 concomitantly with the spindle. For these purposes, the faces of dog jaw 78 and stationary jaw 79 have radially interfitting side faces 92 and 93 respectively. Each of the side faces is angularly divided between raised width circumferential segments 94 and 95 and reduced width circumferential segments 96 and 97 for complementary cooperative interfits therebetween. Interposed between the raised and reduced segments in one circumferential direction are mutually chamfered shoulders 98 and 99 whereas interposed in the opposite circumferential direction are mutually sharp perpendicular shoulders 100 and 101. This arrangement enables jaw slippage by compressing spring 81 when jaw 78 is driven in the reverse direction forcing the chamfered shoulders against each other. On the other hand, opposite rotation in a forward direction encounters the sharp shoulders, interlocking the clutch components and retainer 70 against rotation.

In operation, a nut to be collected and/or assembled is received in hexagonal socket 61 until its inward face engages the lower terminal end face of retainer member 70. Wrench 10 is then operated momentarily in reverse whereby reverse rotation of spindle 37 causes the nut to thread onto retainer threads 71. Restraining retainer 70 against reverse rotation during this initial threadon are the engaging chamfered clutch shoulders 98 and 99. When the inside nut face bottoms against socket face 63, the rotational drag imposed on retainer 70 is transmitted to dog clutch 78 forcing it to wedge downward against spring 81 (shown dashed FIG. 2) until slipping past cooperating shoulder 99 of the stationary jaw. As the latter occurs, a ratcheting noise is produced signaling the operator that the nut is fully positioned on the retainer. Thereafter the tool is stopped while the nut, if to be fastened, is positioned against its receiving bolt or stud. With wrench 10 now operating in a forward direction, clutch shoulders 100 and 101 instantly engage locking their respective jaw members against any relative rotation. At the same time, spindle 37 being rotated forwardly, screws nut 60 onto a stud 102 shown dashed in FIG. 3. With the nut threadedly advancing onto stud 102, the upper stud end extends into bore 64 depressing retainer 70 upward against coil spring 81 until the threading operation is completed. On withdrawing the tool, the operating components revert to the relation of FIG. 2.

By the above description there is disclosed a novel nut collecting and/or retaining socket for attachment to power tools whereby retention and alignment thereof is more reliable and positively secured as compared to such similar purpose retainers of the prior art. The device is relatively simple and inexpensive to fabricate yet achieves a long sought result in enabling positive nut retention when working in remote inaccessible assembly areas in which extreme difficultly has been previously encountered.

Since many changes could be made in the above construction and many apparently widely differently embodiments of this invention could be made without departing from the scope thereof, it is intended that all matter contained in the drawings and specification shall be interpreted as illustrative and not in a limiting sense.

I claim:

1. A fastener retainer attachment for power tools comprising in combination:
    a. a rotatable socket spindle having a socket recess for receiving a nut to be retained;
    b. drive means adapted for drive engaging attachment to the output drive of a power operated fastener tool with which it is to be utilized and operable when driven by said tool output for rotating said spindle;
    c. a nut retaining member support coaxially of said spindle and having an end portion projecting axially inwardly of said socket recess;
    d. threads on the periphery of said retainer end portion effective when said spindle is rotated in a first direction to thread a received nut inwardly of said socket recess and effective when said spindle is rotated in an opposite second direction to thread a received nut outwardly of said socket recess; and
    e. clutch means operable connected to said retaining member for enabling first direction rotation of said retainer concomitantly with said spindle in response to a predetermined inwardly threaded position being reached by the received nut.

2. A fastener retainer according to claim 1 including spring means biasing said retaining member toward projecting inwardly of said socket recess, said spring means enabling said retaining member to axially recede from said socket recess for accommodating receipt of a fastener end on which a retained nut is being assembled during said second directional rotation of said spindle.

3. A fastener retainer according to claim 2 including spring means biasing said clutch means toward restraining said retaining member against rotation.

4. A fastener retainer according to claim 3 in which said clutch means comprise a first jaw secured against rotation and a second jaw rotationally coupled to said retaining member.

5. A fastener retainer according to claim 4 in which the faces of said jaws have mutually opposite edges adapted to axially overlap and engageable in a rotational direction for effectively restraining said second jaw against rotation.

6. A fastener retainer according to claim 5 in which said jaw edges are axially biased into overlapping relation by said spring means and include a first pair of mutually opposite edges engageable when said spindle is rotated in said first direction and a second pair of mutually opposite edges engageable when said spindle is rotated in said second direction.

7. A fastener retainer according to claim 6 in which said first pair of mutually opposite jaw edges extend at an oblique angle to a plane parallel to the axis of spindle rotation and said second pair of mutually opposite jaw edges extend substantially parallel to the axis of spindle rotation.

8. A fastener retainer according to claim 7 in which said predetermined inward position reached by the received nut comprises engaging against the bottom wall of said socket recess.

9. A fastener retainer according to claim 8 in which said second jaw is axially slideable relative to said retaining member and in which bottom wall engagement by the received nut imposes a first direction rotational force against said second jaw sufficient to wedgedly slide said second jaw on said first pair of jaw edges in opposition to said spring means toward said retaining member and away from said first jaw until rotationally past the latter.

10. A fastener retainer according to claim 9 in which the axis of said spindle extends substantially normal to the rotational output axis of a tool on which it is adapted to be attached.

* * * * *